US006975602B2

(12) United States Patent
Anderson (10) Patent No.: US 6,975,602 B2
(45) Date of Patent: Dec. 13, 2005

(54) METHODS AND SYSTEMS OF BLOCKING AND/OR DISREGARDING DATA AND RELATED WIRELESS TERMINALS AND WIRELESS SERVICE PROVIDERS

(75) Inventor: David R. Anderson, Forest, VA (US)

(73) Assignee: Ericsson, Inc., Research Triangle Park, NC (US)

( * ) Notice: Subject to any disclaimer, the term of this patent is extended or adjusted under 35 U.S.C. 154(b) by 914 days.

(21) Appl. No.: 09/915,712

(22) Filed: Jul. 26, 2001

(65) Prior Publication Data

US 2003/0021244 A1    Jan. 30, 2003

(51) Int. Cl.[7] .............................................. H04Q 7/00
(52) U.S. Cl. .................. 370/328; 370/338; 379/142.05
(58) Field of Search ................ 370/230, 235, 370/310, 328, 338, 433, 503, 912, 913; 379/142.05

(56) References Cited

U.S. PATENT DOCUMENTS

| | | | | |
|---|---|---|---|---|
| H1880 H | * | 10/2000 | Vines et al. ................ | 370/310 |
| 6,226,523 B1 | | 5/2001 | Karlsson et al. ............ | 455/466 |

FOREIGN PATENT DOCUMENTS

| | | | | |
|---|---|---|---|---|
| EP | 0 909 073 | 4/1999 | ........... | H04L 29/06 |
| WO | WO 01/33889 | 5/2001 | ............ | H04Q 7/38 |
| WO | WO 02/23831 | 3/2002 | ........... | H04L 12/56 |

OTHER PUBLICATIONS

Copy of PCT International Search Report PCT/US02/24211.

* cited by examiner

*Primary Examiner*—Chau Nguyen
*Assistant Examiner*—Joshua Kadiing
(74) *Attorney, Agent, or Firm*—Myers Bigel Sibley & Sajovec (57) ABSTRACT

When receiving digital data at a wireless terminal, sources from which received digital data will be processed can be designated at a wireless terminal. When a packet of digital data is received at the wireless terminal, it can be determined if the packet is from an acceptable source designated at the wireless terminal. If the packet of digital data is from an acceptable source, the packet of digital data can be processed, and if the packet of digital data is not from an acceptable source, the packet of digital data can be blocked from processing. Alternate methods of transmitting and receiving digital data and related wireless terminals and wireless service providers are also discussed.

60 Claims, 6 Drawing Sheets

METHODS AND SYSTEMS OF BLOCKING AND/OR DISREGARDING DATA AND RELATED WIRELESS TERMINALS AND WIRELESS SERVICE PROVIDERS

BACKGROUND OF THE INVENTION

The present invention relates to wireless terminals and service providers and more particularly to methods of transmitting and/or receiving digital data and related wireless terminals and wireless service providers.

Wireless terminals such as cellular radio telephones, personal digital assistants, and handheld computers may provide high-speed data links to the Internet and other data services. Higher speed data links provided by current and future wireless networks may also allow two way information transfers, and multiple data exchanges may occur simultaneously.

With high-speed two-way always-online data links, malicious and/or unauthorized data transfers to/from the wireless terminal without knowledge of the user may be more likely to occur. For example, information may be extracted from a wireless terminal without user consent, and/or harmful information such as a virus may be directed to the wireless terminal.

While the wireless terminal may be turned off to prevent undesired transfers, there may be an undesirable service acquisition time required to reestablish the data link. Moreover, desired communications could be missed when the wireless terminal is turned off.

SUMMARY OF THE INVENTION

According to embodiments of the present invention, sources from which received digital data will be processed can be designated at a wireless terminal, and when a packet of digital data is received at the wireless terminal, it can be determined if the packet is from an acceptable source designated at the wireless terminal. If the packet of digital data is from an acceptable source, the packet of digital data can be processed, and if the packet of digital data is not from an acceptable source, the packet of digital data can be blocked from processing.

Alternately, acceptable sources from which packets of digital data will be transmitted to a wireless terminal can be designated at a wireless service provider. When a packet of digital data is provided at the wireless service provider to be transmitted to the wireless terminal, it can be determined if the packet of digital data is from an acceptable source. If the packet of digital data is from an acceptable source, the packet of digital data can be transmitted to the wireless terminal, and if the packet of digital data is not from an acceptable source, the packet of digital data can be blocked from transmission to the wireless terminal.

According to additional embodiments of the present invention, user input of blocking mode enable and blocking mode disable commands can be accepted, and used when receiving a packet of digital data at a wireless terminal. In response to a blocking mode enable command, the packet of digital data may be processed only if information in the packet of digital data is required to maintain a communications link, and processing of the packet of digital data may be blocked if information in the packet of digital data is not required to maintain a communications link. In response to a blocking mode disable command, the packet of digital data may be processed if information in the packet of digital data is required to maintain a communications link or if information in the packet of digital data is desired at the wireless terminal.

Alternately, blocking mode enable and blocking mode disable commands may be accepted from a user terminal for use when a packet of digital data is provided at a wireless service provider. In response to a blocking mode enable command, the packet of digital data may be transmitted only if information in the packet of digital data is required to maintain a communications link between the wireless service provider and the wireless terminal, and transmitting of the packet of digital data may be blocked if information in the packet of digital data is not required to maintain a communications link. In response to a blocking mode disable command, the packet of digital data may be transmitted if information in the packet of digital data is required to maintain a communications link or if information in the packet of digital data is desired at the wireless terminal.

According to still additional embodiments of the present invention, user input of external request mode enable and external request mode disable commands can be accepted. In response to an external request mode enable command, external requests for data transfer can be executed at the wireless terminal. In response to an external request mode disable command, external requests for data transfer at the wireless terminal can be disregarded.

Alternately, external request mode enable and external request mode disable commands for a wireless terminal can be accepted at a wireless service provider. In response to an external request mode enable command for the wireless terminal, external requests for data transfer can be transmitted to the wireless terminal. In response to an external request mode disable command for the wireless terminal, external requests for data transfer can be disregarded at the wireless terminal.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by those of skill in the art, the present invention may be embodied as methods or devices. Accordingly, the present invention may take the form of hardware embodiments, software embodiments or embodiments combining software and hardware aspects.

Figure 1:
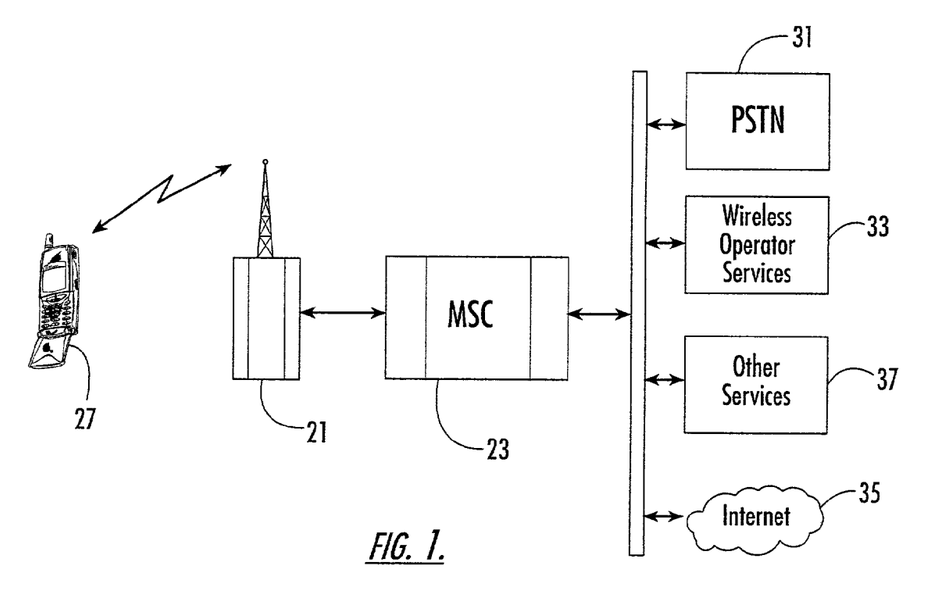
FIG. 1 is a block diagram illustrating wireless terminals and service providers according to embodiments of the present invention.

A block diagram of a wireless system according to embodiments of the present invention is illustrated in FIG. 1. As shown, a wireless service provider may include at least one base station 21 and a mobile switching center (MSC) 23. As will be understood by those having skill in the art, a plurality of base stations 21 may be coupled with the mobile switching center 23 to provide service over a respective plurality of coverage areas, and additional mobile switching centers with additional base stations may also be provided as known in the field of cellular communications. Aspects of the present invention, however, can also be embodied in non-cellular communications systems.

The wireless service provider including base station 21 and mobile switching center 23 can provide communications between the wireless terminal 27 and one or more of a public switched telephone network (PSTN) 31, wireless operator services 33, the Internet 35, or other services 37. The wireless service provider, for example, may provide wireless operator services 33 such as information and/or shopping or other operator services 37 such as e-mail as part of a service plan. Moreover, the wireless terminal 27 can be any electronic device that transmits and/or receives digital data from the wireless service provider. The wireless terminal 27, for example, can be a personal digital assistant (PDA), a digital radiotelephone, a dual mode device providing PDA and radiotelephone functions, and/or a wireless personal computer.

Radiotelephone communications services may be provided as will be understood by those having skill in the art. In particular, a radiotelephone communication can be initiated by a user of the wireless terminal 27 by placing a call. For radiotelephone communications initiated by other devices, a radiotelephone page is transmitted to the wireless terminal 27 where the user may decide to respond by answering the call. If the user does not respond to the radiotelephone page, a radiotelephone communication will not be established with the wireless terminal 27. Accordingly, security for radiotelephone communications may be provided in that a radiotelephone communication is only established for the radiotelephone if the user either initiates or actively accepts a radiotelephone communication.

According to aspects of the present invention, an open data link may also be maintained between the wireless terminal 27 and the base station 21 so that packets of digital data may be transmitted therebetween without requiring user input or intervention. For example, packets of digital data may be transmitted to/from the wireless terminal 27 at predetermined intervals, at the request of the wireless service provider, at the request of other devices via the Internet 35 and/or PSTN 31, and/or at the request of other wireless terminals. The wireless service provider, for example, may automatically download files/information to provide updated service options, and/or other wireless terminals and/or devices coupled through the Internet 35 or PSTN 31 may request files (such as MP3 music files or through other file sharing arrangements) from the wireless terminal 27 without requiring any input from the user of the wireless terminal 27.

In other words, data transmission/reception at the user terminal may be initiated by parties other than the user of the wireless terminal. This transmission/reception of packets of digital data is different than that of a radiotelephone communication in that a radiotelephone communication is performed when either the user initiates the radiotelephone communication by placing a call or by the user responding to a radiotelephone incoming call page (i.e. answering a call). Internet functionality now being provided by many PDA's, however, may allow access to the wireless terminal 27 without user intervention via an open data link between the wireless terminal 27 and the mobile service provider.

The increasing bandwidth of these open data links may increase the likelihood that another party may intentionally or unintentionally transmit data to the wireless terminal 27 that could cause harm to the wireless terminal 27. A hacker, for example, may be able to transmit a virus or otherwise corrupt the wireless terminal 27. In addition, permissive access provided to other parties (such as an MP3 or other file sharing arrangements) may consume bandwidth of the data link and/or wireless terminal processor capacity so that other activities of the wireless terminal 27 may be delayed.

According to aspects of the present invention, the wireless terminal 27 may restrict processing of packets of digital data received and/or the wireless service provider may restrict transmission of packets of digital to the wireless terminal 27 to reduce the risk of harmful data transmissions and/or to reduce inconvenience to the user. The user, for example, may designate one or more classes of sources from which packets of digital data will be accepted, and/or the user may designate one or more specific sources from which packets of digital data will be accepted. In addition, the user may specify when external requests will and will not be executed by the wireless terminal 27. Accordingly, the user of the wireless terminal 27 can designate when the full bandwidth of the data link will be reserved for user initiated exchanges.

Figure 2:
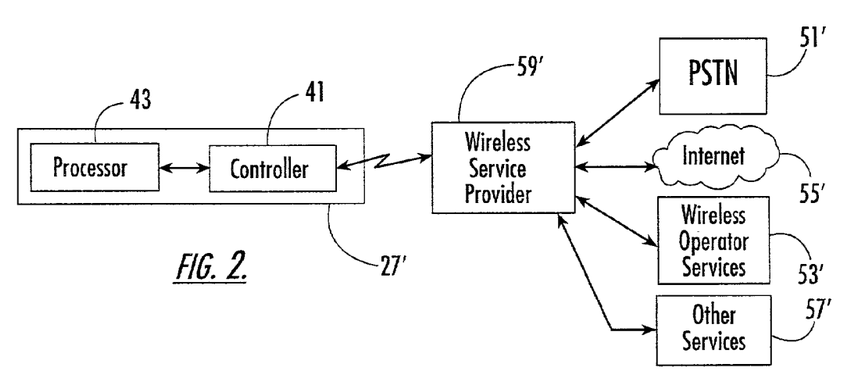
FIG. 2 is a block diagram illustrating alternate wireless terminals and service providers according to alternate embodiments of the present invention.

As shown in FIG. 2, the wireless terminal 27' can include a controller 41 to determine which packets of digital data from the wireless service provider 59' are provided to the processor 43. Accordingly, packets of digital data from the Internet 55', wireless operator services 53', or other services 57' can be transmitted to the wireless terminal 27' wherein the controller 41 can select which packets of digital data are provided to the processor 43. Radiotelephone call pages, such as pages identifying radiotelephone calls from telephones over the PSTN 51' or from other wireless terminals can be passed through the controller 41 regardless of restrictions placed on packets of digital data from other sources. Similarly, packets of digital data required for maintenance of the data link between the wireless terminal 27' and the wireless service provider 59' can be passed through to the processor 43 regardless of restrictions placed on packets of digital data from other sources.

Figure 3:
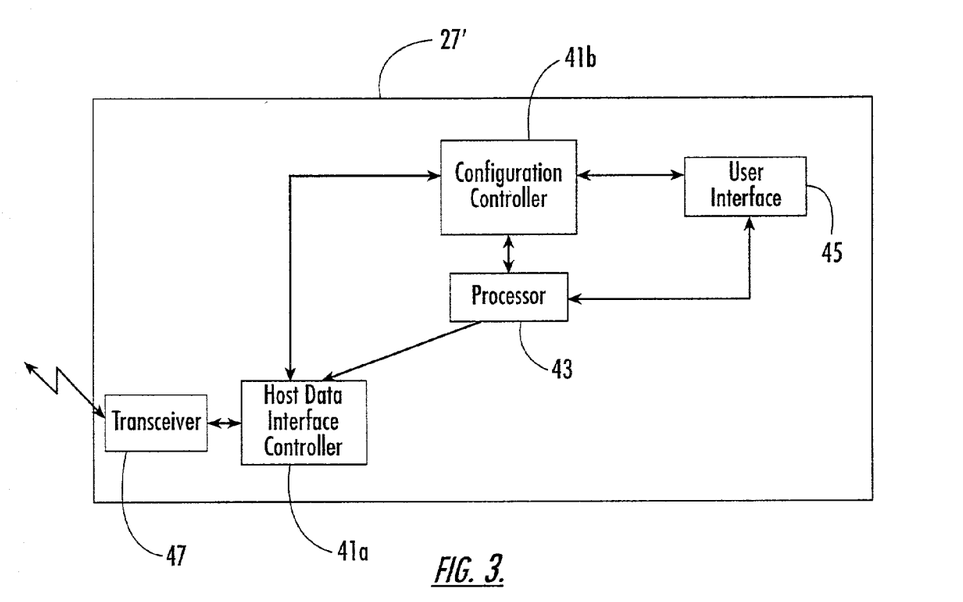
FIG. 3 is a block diagram illustrating wireless terminals according to additional embodiments of the present invention.

FIG. 3 illustrates an expanded block diagram of an embodiment of a wireless terminal 27'. In particular, the host data interface controller 41a and the configuration controller 41b may provide functionality of a controller, and the processor 43 may be the same in both FIGS. 2 and 3. FIG. 3 further illustrates a transceiver 47 and a user interface 45. The transceiver 47 can transmit and/or receive to and/or from a wireless service provider to maintain a wireless data link therewith.

When a packet of digital data is received at the transceiver 47, the host data interface controller 41a can selectively pass the packet of digital data to the processor 43 according to a configuration stored in the configuration controller 41b. The configuration can be defined by a user of the wireless terminal 27' by inputting configuration information via the user interface 45. The user of the wireless terminal 27' can thus define sources of packets of digital data and/or types of received packets of digital data that will be passed by the host data interface controller 41a to the processor 43. Risk of processing malicious, harmful, or disruptive packets of digital data can thereby be reduced. Moreover, access of the processor 43 to external requests can be reduced to preserve bandwidth for tasks requested by the user.

The user, for example, may designate acceptable sources from which received packets of digital data will be processed. When a packet of digital data is received at the transceiver 47, the host data interface controller 41a can determine if the received packet of digital data is from an acceptable source designated at the configuration controller 41b. If the received packet of digital data is from an acceptable source, the received packet of digital data can be provided to the processor 43. Alternately, the received packet of digital data can be blocked from further processing by the host data interface controller 41a if the received packet of digital data is not from an acceptable source.

As discussed above, the designation of acceptable sources can be accepted from the user using the user interface 45. More particularly, the one or more classes of acceptable sources can be designated and/or one or more specific sources may be designated. The user, for example, may designate packets of digital data from one or more Internet addresses as being acceptable, and/or the user may designate a class of acceptable sources. The wireless terminal 27' can thus be configured to accept packets of digital data for processing only from designated acceptable sources, and to block processing of packets of digital data from other sources. Security can thus be enhanced by not processing data from sources not designated by the user.

The user can also enable and disable a blocking mode of the configuration controller 41b via input at the user interface 45. When the blocking mode is enabled, a packet of digital data received at the transceiver 47 is forwarded to the processor 43 only if information in the packet is required to maintain the communications link between the wireless terminal 27' and a wireless service provider 59'. When the blocking mode is enabled, processing of a packet of digital data is blocked if information in the packet is not required to maintain a communications link even if the packet is received from a source designated acceptable. When the blocking mode is disabled, a packet of digital data can be transmitted to the processor 43 as long as it meets any other criteria (such as being from a source or class of sources designated acceptable) defined in the configuration controller 41b.

Accordingly, the blocking mode can be used to disable all data packet transmission from a wireless service provider 59' to the processor 43 except for data packets required to maintain the data link. The user can thus disable the blocking mode and have immediate access to the data link because the data link has been maintained. In particular, the host data interface controller 41a can allow processing of packets including information such as synchronization information required to maintain the communications link when the blocking mode is enabled. In addition, the host data interface controller 41a can also allow processing of radiotelephone pages when the blocking mode is either enabled or disabled.

The host data interface controller 41a can also be used to deny external requests for data transfer. For example, the configuration controller 41b can be used to enable or disable an external request mode based on user input at the user interface 45. When the external request mode is enabled, external requests for data transfer can be forwarded by the host data interface controller 41a for execution by the processor 43. Alternately, external requests for data transfer can be disregarded by the host data interface controller 41a when the external request mode is disabled. The user can thus determine when external requests for data transfer (such as those supported by MP3 file sharing arrangements) will be executed.

When the external request mode is disabled, the wireless terminal 27' can still execute user initiated tasks. The user, for example, may wish to disable the external request mode so that bandwidth of the data link with the wireless service provider 59' will not be consumed executing external requests at times when the user wishes to execute operations taking advantage of the full bandwidth available over the data link. In addition, radiotelephone pages may be received and processed when the external request mode is either enabled or disabled.

The wireless terminal 27' of FIG. 3 can thus provide user control of received data and/or external requests for data transfer via the configuration controller 41b and the host data interface controller 41a. These features discussed above, can be used to provide increased security and/or increased control over outside access to the wireless terminal processor 43. These features may alternately be provided at the wireless service provider 59' as discussed in greater detail below with regard to FIG. 4.

Figure 4:
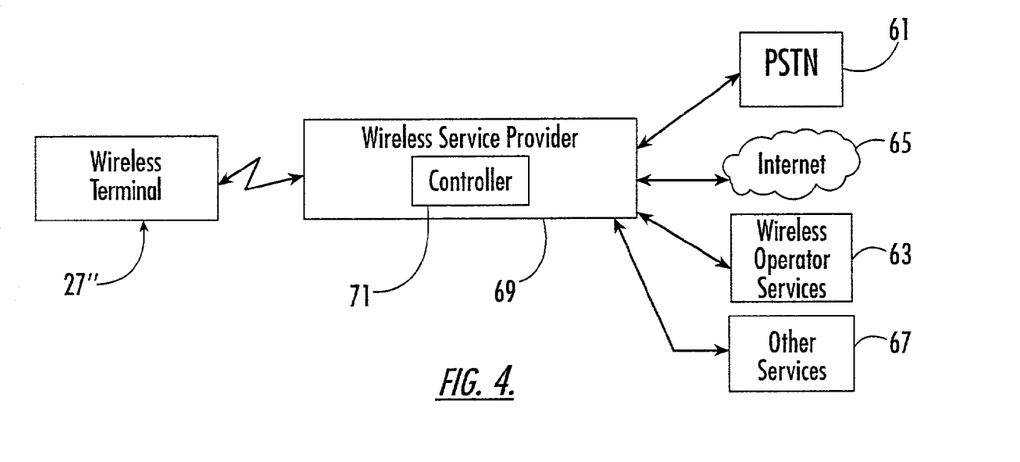
FIG. 4 is a block diagram illustrating wireless terminals and service providers according to still additional embodiments of the present invention.

As shown in FIG. 4, communications services for a wireless terminal 27" may be provided by a wireless service provider 69 including a controller 71. According to the example of FIG. 4, the controller 71 blocks transmission of data packets according to user preferences/designations for the wireless terminal 27". The user preferences/designations may be input into the wireless terminal 27" and transmitted to the wireless service provider 69, or the user preferences/designations may be transmitted to the wireless service provider via the Internet 65, the PSTN 61, or via other means.

According to embodiments of the present invention, acceptable sources from which packets of digital data will be transmitted to the wireless terminal 27" can be designated at the controller 71. When a packet of digital data to be transmitted to the wireless terminal 27" is provided at the wireless service provider 69, the controller 71 can determine if the packet is from an acceptable source. If the packet of digital data is from an acceptable source, the controller 71 can allow the packet to be transmitted to the wireless terminal 27". If the packet is not from an acceptable source, the controller 71 can block transmitting of the packet to the wireless terminal 27".

As discussed above, the designation of acceptable sources can be received from the mobile terminal 27" responsive to user input at the wireless terminal 27". These designations, for example, can be entered at a user interface of the wireless terminal 27" and transmitted to the wireless service provider any time the user wishes to change designation of acceptable sources. As discussed above, the designation of acceptable sources can include a designation of at least one class of sources and/or at least one specific source from which digital data will be transmitted to the wireless terminal.

The controller 71 can also accept blocking mode enable and disable commands for the wireless terminal 27". The commands can be received from the wireless terminal or via other means such as the Internet 65 or PSTN 61. When the blocking mode is enabled for the wireless terminal 27", a packet of digital data will be transmitted only if information in the packet of digital data is required to maintain the communications link between the wireless service provider 69 and the wireless terminal 27". A packet of digital data will be blocked from transmission to the wireless terminal 27" when the blocking mode is enabled if information in the packet is not required to maintain a communications link even if the packet is from a designated acceptable source. A packet from an acceptable source may be transmitted to the wireless terminal 27" when the blocking mode is disabled for the wireless terminal 27".

The controller 71 can thus block transmission of packets of digital data to the wireless terminal 27" except for packets including information such as synchronization information required to maintain the communications link when the blocking mode is enabled for the wireless terminal 27". In addition, radiotelephone pages for the wireless terminal 27" may be transmitted when the blocking mode is either enabled or disabled for the wireless terminal to provide radiotelephone communications.

The controller 71 can also accept external request mode enable and disable commands for the wireless terminal 27". When the external request mode is enabled, the controller 71 may allow transmission of external requests for data transfer for the wireless terminal 27". Alternately, the controller 71 may disregard requests for data transfer for the wireless terminal 27" when the external request mode is disabled for the wireless terminal 27". In addition, radiotelephone pages for the wireless terminal 27" can be transmitted when the external request mode is either enabled or disabled.

The controller 71 can be provided as an additional portion of a known component of a wireless service provider 69 such as a base station or mobile switching center. Alternately, the controller 71 can be provided as a separate component of a wireless service provider 69 such as an additional component between a central office and one or more mobile switching centers, or between one or more mobile switching centers and the respective base stations.

As discussed above, functionality according to embodiments of the present invention can be implemented at either the wireless terminal 27" or the wireless service provider 69. Moreover, these functionalities can provide improved security at the wireless terminal 27" and improved user control of bandwidth available to the user of the wireless terminal 27".

Aspects of the present invention are described above and below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/art specified in the flow chart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Moreover, one or more blocks may be combined or one or more blocks may be illustrated as multiple blocks. In addition, the order of the blocks may be changed.

Figure 5:
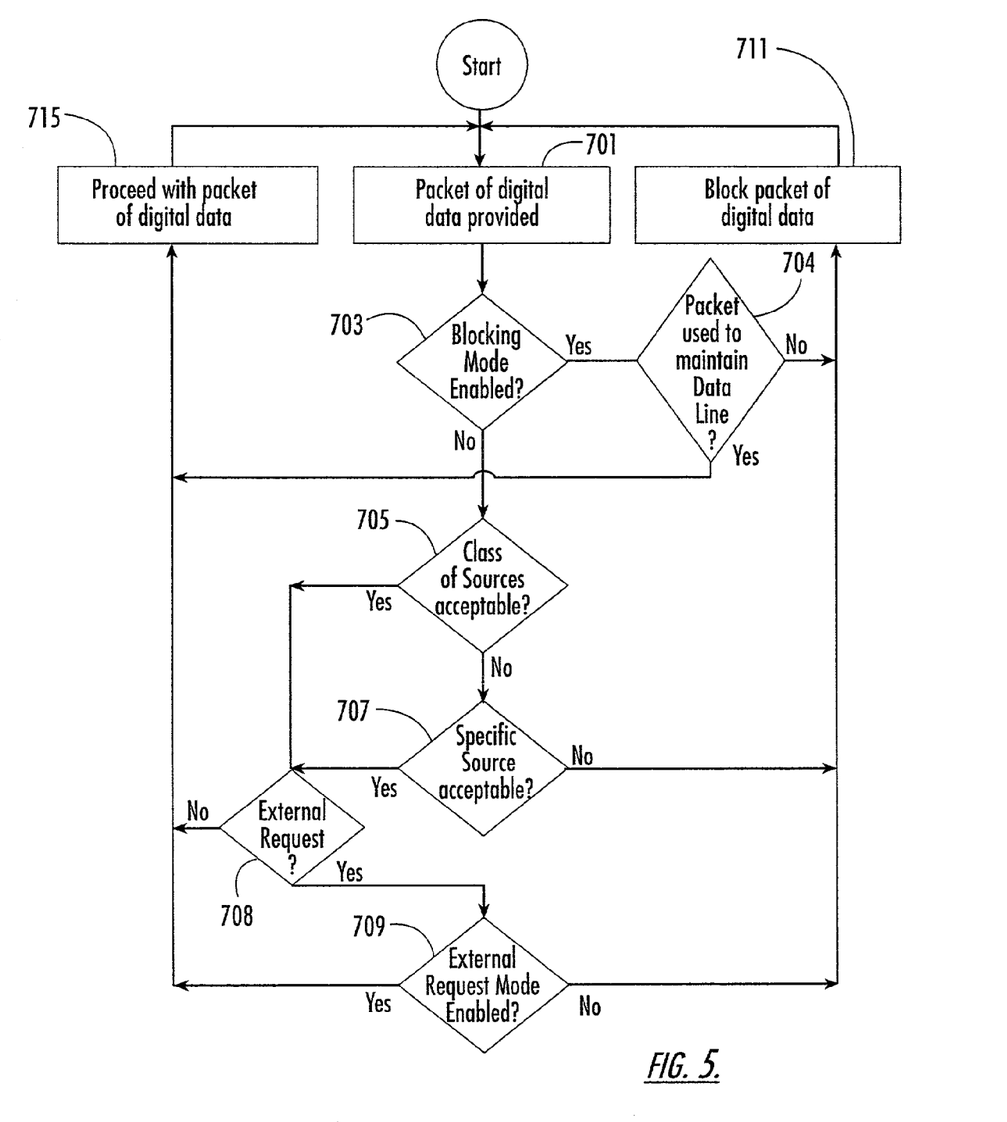
FIGS. 5–8 are flow charts illustrating operations of wireless terminals and/or wireless service providers according to embodiments of the present invention.

FIG. 5 illustrates operations of determining if a packet of digital data should be processed by a wireless terminal according to embodiments of the present invention. Operations of FIG. 5 can be implemented by a configuration controller and/or a host interface data controller of a wireless terminal to determine if a received packet of digital data should be processed at the wireless terminal. Alternately, operations of FIG. 5 can be implemented by a controller of a wireless service provider to determine if a packet of digital data should be transmitted to a wireless terminal. In either case, a user of the wireless terminal can determine whether particular modes are enabled or disabled.

At block 701, a packet of digital data can be provided either at a wireless terminal or at a wireless service provider for transmission to the wireless device. If the blocking mode is enabled for the wireless terminal at block 703 and the packet does not include information (such as synchronization information) used to maintain the data link at block 704, the packet of digital data can be blocked from processing at the wireless terminal or the packet of digital data can be blocked from transmission at the wireless service provider at block 711. If the blocking mode is enabled for the wireless terminal at block 703 and the packet does include information used to maintain the data link at block 704, the packet of digital data can be processed at the mobile terminal or transmitted to the mobile terminal at block 715. If the blocking mode is not enabled at block 703, the packet of digital data can be processed at the mobile terminal or transmitted to the mobile terminal provided that any other criteria for processing/transmitting the packet is met as shown for example at blocks 705, 707, and 709.

At block 705, a determination can be made if the packet of digital data is from an acceptable class of sources, and at block 707, a determination can be made if the packet of digital data is from a specific acceptable source. If the packet of digital data is not from an acceptable source or class of sources, the packet of digital data can be blocked at the wireless terminal from processing or blocked at the wireless service provider from transmission to the wireless terminal at block 711. If the packet of digital data is from a specific acceptable source or from and acceptable class of sources, the packet of digital data can be processed at the mobile terminal or transmitted to the mobile terminal at block 715 provided that any other criteria for processing/transmitting the packet is met.

At block 708, it can be determined if the packet of digital data relates to an external request for data transfer. If the packet of digital data relates to an external request for data transfer at block 708, and the external request mode is enabled at block 709, the wireless terminal can proceed with processing the packet or the wireless services provider can transmit the packet to the wireless terminal at block 715 provided that any other criteria for processing/transmitting the packet of digital data is met. Alternately, the wireless terminal or the wireless services provider can disregard a packet relating to an external request for data transfer if the external request mode is disabled at block 709. Accordingly, the user of the wireless terminal can reserve the full processing power of the wireless terminal and the full bandwidth of the data link by disabling the external request mode. Alternately, the wireless terminal or the wireless services provider can proceed with the packet of digital data at block 715 if the packet does not relate to an external request for data transfer at block 708 whether the external request mode is enabled or disabled.

As shown in the flow chart of FIG. 5, the various decisions of blocks 703, 705, 707, and 709 can be performed serially so that all of the blocking/filtering operations are performed for a packet of digital data. Wireless terminals and/or wireless service providers according to the present invention, however, may also be implemented with fewer than all of the blocking/filtering operations of FIG. 5.

Figure 6:
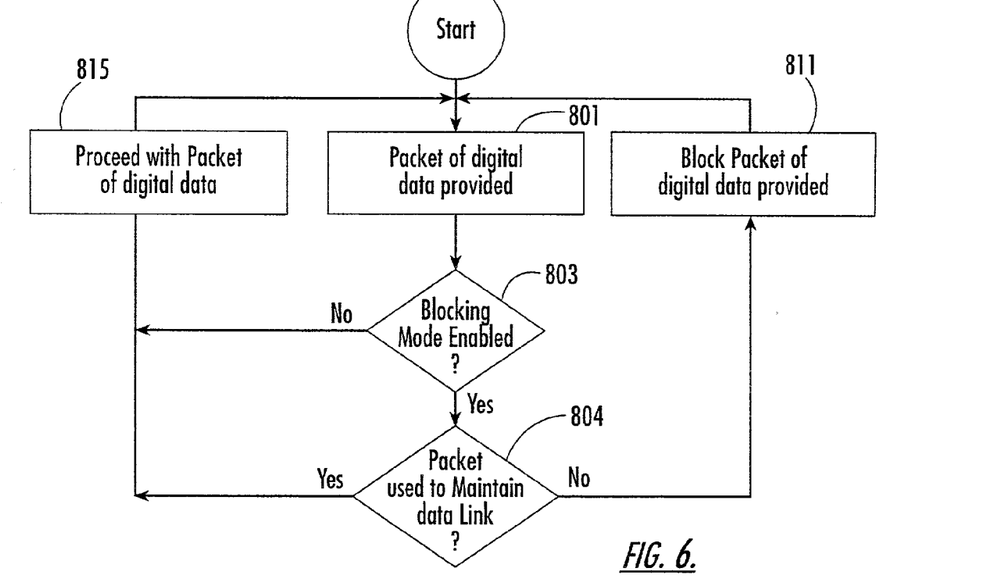

As shown in FIG. 6, wireless terminals and/or wireless service providers according to embodiments of the present invention may be implemented with a blocking mode enable operation. In particular, a packet of digital data may be received at the wireless terminal or provided at a wireless service provider for transmission to the wireless terminal at block 801. If a blocking mode is enabled at block 803, the packet is blocked from processing at the wireless terminal or blocked from transmission to the wireless terminal at block 811 unless information of the packet is used to maintain the data link at block 804. If the blocking mode is not enabled at block 803 and/or if the packet is used to maintain the data link at block 804, the wireless terminal can proceed to process the packet or the wireless service provider can proceed to transmit the packet at block 815 provided that any other criteria for the packet are satisfied.

Figure 7:
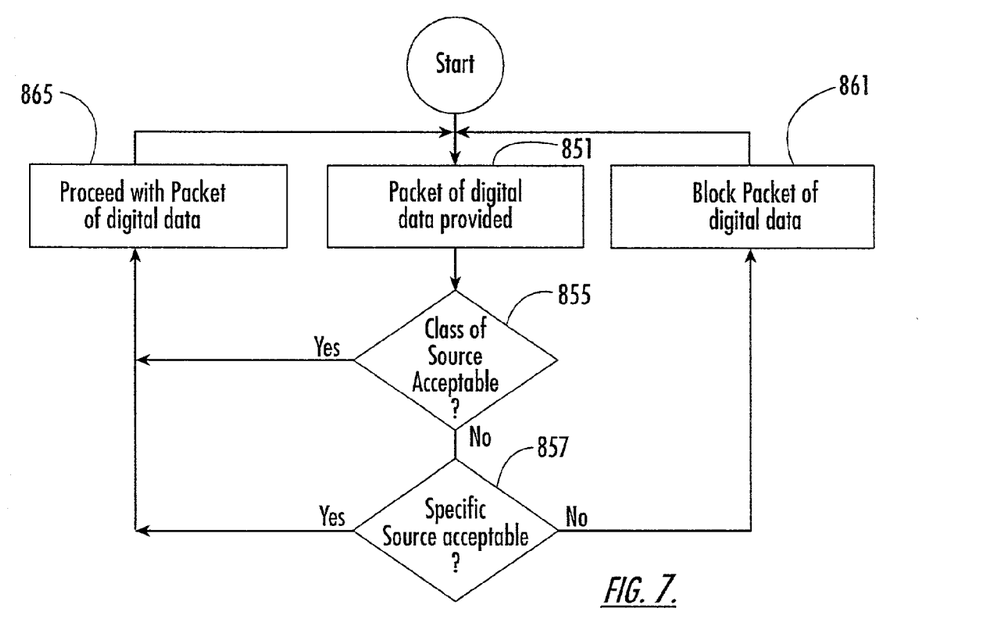

As shown in FIG. 7, a packet of digital data may be received at a wireless terminal or provided at a wireless service provider for transmission to the wireless terminal at block 851. Classes of acceptable sources and/or specific acceptable sources may be designated for the wireless terminal such that the wireless terminal will not process packets that are not from an acceptable source or from a source of an acceptable class, or the wireless service provider will not transmit packets to the wireless terminal that are not from an acceptable source or from a source of an acceptable class. If the packet is from a source included in a class of acceptable sources at block 855, the wireless terminal can proceed to process the packet or the wireless service provider can proceed to transmit the packet at block 865. If the packet is from a specific source designated acceptable for the wireless terminal at block 857, the wireless terminal can proceed to process the packet or the wireless service provider can proceed to transmit the packet at block 865. If the packet is not from a source that is either specifically designated acceptable or in a class designated acceptable, the packet can be blocked from processing or transmission at block 861.

Figure 8:
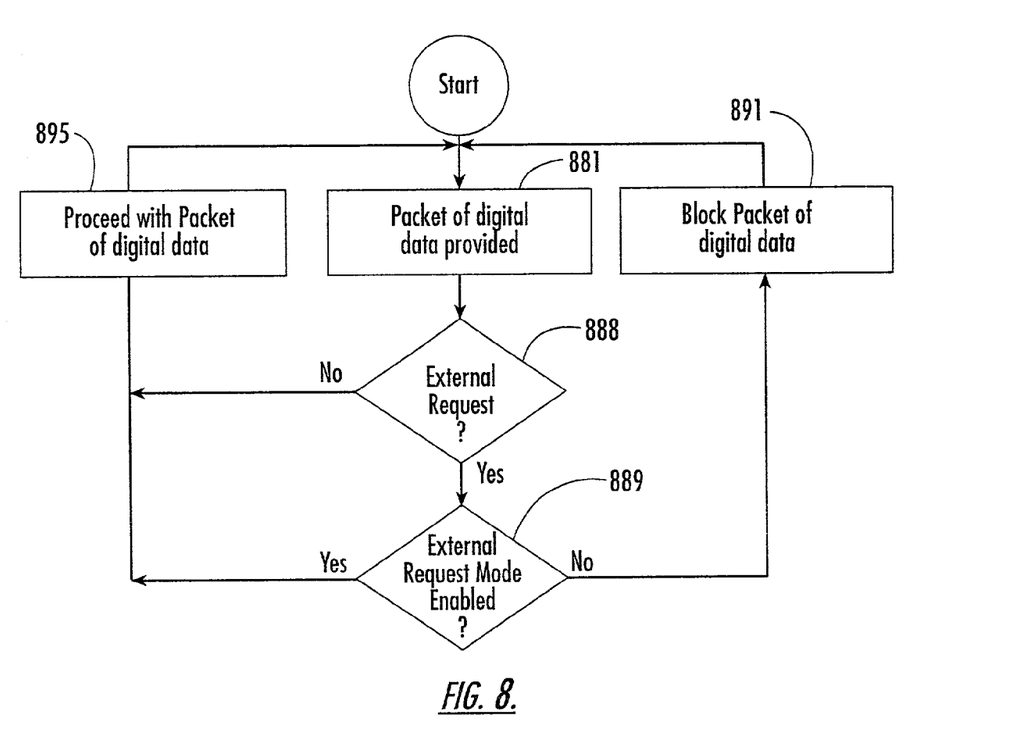

As shown in FIG. 8, a packet of digital data may be received at a wireless terminal or provided at a wireless service provider for transmission to the wireless terminal at block 881. If the packet does not relate to an external request for data transfer at block 888, the wireless terminal can process the packet or the wireless service provider can transmit the packet at block 895 provided that any other criteria for the packet are satisfied. If the packet is related to an external request for data transfer at block 888, and the external request mode is enabled at block 889, the wireless terminal can process the packet or the wireless service provider can transmit the packet at block 895. If the packet is related to an external request for data transfer at block 888, but the external request mode is not enabled at block 889, however, the wireless terminal can block processing of the packet or the wireless service provider can block transmitting the packet at block 891. The bandwidth of the data link and/or the processing capacity of the wireless terminal can be reserved for tasks initiated by a user of the wireless terminal.

The operations illustrated in FIGS. 5–8 allow a user to enable/disable and/or filter a data link between a wireless terminal and a wireless service provider. Accordingly, the user of the wireless terminal can control and protect operations of the wireless terminal while the wireless terminal is idle without turning the wireless terminal off. By maintaining the data link on, use of the data link is quickly available because the data link does not need to be reestablished. As discussed above, the user of the wireless terminal can designate acceptable sources and/or classes of sources from which packets of digital data will be accepted. The user of the wireless terminal can also enable/disable blocking and/or enable/disable external request modes. As discussed above, the data link can be enabled/disabled and/or filtered by blocking transmissions of packets from the wireless service provider and/or by blocking processing of packets received at the wireless terminal.

When a blocking mode is enabled, all data traffic can be disabled by either blocking transmissions from the wireless service provider to the wireless terminal, or by blocking processing of packets at the wireless terminal. In order to maintain the data link, however, packets used to maintain the data link may be transmitted to and processed by the wireless terminal when the blocking mode is enabled. Accordingly, data transmissions over the data link can be quickly resumed when the blocking mode is disabled. Moreover, if the wireless terminal is a dual mode device such as a Internet enabled cellular radiotelephone, the blocking mode may be enabled without interfering with radiotelephone operations. In other words, radiotelephone pages from the wireless service provider may be transmitted to and processed by the wireless terminal even when the blocking mode is enabled.

A data link between a wireless terminal and a wireless service provider can be controlled according to embodiments of the present invention at the wireless device. The wireless device, for example, can include a user interface to accept user input used to set data link configurations at either the wireless terminal or the wireless service provider. As shown in FIG. 3, the user interface 45 can be used to accept user commands for the configuration controller 41*b*. According to embodiments illustrated in FIG. 4, a user interface at wireless terminal 27" can be used to accept user commands that are transmitted to the controller 71 of the wireless service provider 69.

With respect to blocking mode enable and disable operations according to embodiments of the present invention, a last state can be remembered at the wireless terminal when the wireless terminal is turned off or at the wireless service provider when communication with the wireless terminal is lost. The last state of the blocking mode can thus be maintained at the wireless terminal when powered on or at the wireless service provider when communications are resumed. In addition, the blocking mode can be enabled automatically after a configurable inactivity time has elapsed so that the data link is blocked at either the wireless terminal or at the wireless service provider after some defined period of inactivity. If a user of the wireless terminal initiates a session with an insecure data service while the blocking mode is enabled, a security warning may be provided to the user, or the blocking mode may be disabled to allow the session to proceed.

As illustrated in FIG. 7, embodiments of the present invention may allow flexibility to accept or reject queries or information from different sources through multiple levels of security. A user can build a custom multilevel security profile that acts as a filter. Various information sources, for example, can be identified and grouped as trusted or known. Trusted sources, for example, may include the user's e-mail server, the user's wireless service provider, an Instant Messaging server, and/or a short message service (SMS) server. Such user configurations could allow the wireless device to receive e-mail, SMS messages, and/or device software and/or network updates from the carrier. Unexpected, unknown, and/or unsolicited attempts to access the wireless terminal can be blocked. Inquiries within a particular level or service can be further filtered by providing a blocked list of junk senders of "junk SMS" or "junk e-mail" messages. In addition, a blocking mode according to embodiments illustrated in FIG. 6 can provide a "hard lock" allowing the user instant on/off control of the data link.

As discussed above, configurations for classes of acceptable sources, specific acceptable sources, blocking mode operations, and/or external request mode operations may be implemented at the wireless terminal, at the wireless service provider, or split between the two. Factors impacting partitioning of these functionalities between the wireless terminal and the wireless service provider may include funneling of services through a common network gateway or not, access to configuration settings while network roaming, and/or memory and/or menu resources in the wireless terminal.

As discussed above with regard to embodiments of FIG. 8, external requests can be enabled or disabled to provide bandwidth control of the data link between the wireless terminal and the wireless service provider. Such bandwidth control may be desirable for a user that frequently operate a wireless terminal in a file sharing mode allowing other users to upload files from the wireless device. It may be desirable, for example, to suspend external requests for uploads (such as MP3 music file uploads) when a bandwidth intensive task such as multimedia viewing or a large file transfer (such as an MP3 download) is being performed. All available bandwidth can thus be reserved to tasks initiated at the wireless terminal.

In the drawings and specification, there have been disclosed typical preferred embodiments of the invention and, although specific terms are employed, they are used in a generic and descriptive sense only and not for the purposes of limitation, the scope of the invention being set forth in the following claims.

What is claimed is:

1. A method of receiving digital data at a wireless terminal, the method comprising:
designating at the wireless terminal acceptable sources from which received digital data will be processed;
receiving a packet of digital data at the wireless terminal;
determining if the packet of digital data is from an acceptable source designated at the wireless terminal;
if the packet of digital data is from an acceptable source, processing the packet of digital data;
if the packet of digital data is not from an acceptable source, blocking the packet of digital data from processing;
accepting user input of blocking mode enable and blocking mode disable commands;
in response to a blocking mode enable command, processing the packet of digital data only if information in the packet of digital data is required to maintain a communications link, and blocking processing of the packet of digital data if information in the packet of digital data is not required to maintain a communications link even when the packet of digital data is from an acceptable source; and
in response to a blocking mode disable command, processing the packet of digital data if the received packet of digital data is from an acceptable source.

2. A method according to claim 1 wherein designating at the wireless terminal acceptable sources from which packets of digital data will be processed comprises accepting user input of the acceptable sources.

3. A method according to claim 1 wherein designating at the wireless terminal acceptable sources from which packets of digital data will be processed comprises designating at least one class of sources from which packets of digital data will be processed.

4. A method according to claim 1 wherein designating at the wireless terminal acceptable sources from which packets of digital data will be processed comprises designating at least one specific source from which packets of digital data will be processed.

5. A method according to claim 1 wherein information required to maintain a communications link comprises synchronization information.

6. A method according to claim 1 further comprising:
processing radiotelephone pages when the blocking mode is enabled and when the blocking mode is disabled.

7. A method according to claim 1 further comprising:
accepting user input of external request mode enable and external request mode disable commands;
in response to an external request mode enable command, executing external requests for data transfer at the wireless terminal; and
in response to an external request mode disable command, disregarding external requests for data transfer at the wireless terminal.

8. A method according to claim 7 further comprising:
executing user initiated tasks when the external request mode is enabled and when the external request mode is disabled.

9. A method according to claim 7 further comprising:
receiving radiotelephone pages when the external request mode is enabled and when the external request mode is disabled.

10. A method of transmitting digital data from a wireless service provider to a wireless terminal, the method comprising:
designating at the wireless service provider acceptable sources from which packets of digital data will be transmitted to the wireless terminal;
providing a packet of digital data at the wireless service provider to be transmitted to the wireless terminal;
determining if the packet of digital data is from an acceptable source;
if the packet of digital data is from an acceptable source, transmitting the packet of digital data to the wireless terminal;
if the packet of digital data is not from an acceptable source, blocking the packet of digital data from transmission to the wireless terminal;
accepting blocking mode enable and blocking mode disable commands for the wireless terminal;
in response to a blocking mode enable command, transmitting the packet of digital data only if information in the packet of digital data is required to maintain a communications link, and blocking transmitting of the packet of digital data if information in the packet of digital data is not required to maintain a communications link even when the packet of digital data is from an acceptable source; and in response to a blocking mode disable command, transmitting the packet of digital data if the packet of digital data is from an acceptable source.

11. A method according to claim 10 wherein designating at the wireless service provider acceptable sources from which packets of digital data will be transmitted to the wireless terminal comprises receiving the acceptable sources from the wireless terminal.

12. A method according to claim 10 wherein designating at the wireless service provider acceptable sources from which packets of digital data will be transmitted to the wireless terminal comprises designating at least one class of sources from which packets of digital data will be transmitted to the wireless terminal.

13. A method according to claim 10 wherein designating at the wireless service provider acceptable sources from which packets of digital data will be transmitted to the wireless terminal comprises designating at least one specific source from which packets of digital data will be transmitted to the wireless terminal.

14. A method according to claim 10 wherein information required to maintain a communications link comprises synchronization information.

15. A method according to claim 10 further comprising:
transmitting radiotelephone pages when the blocking mode is enabled and when the blocking mode is disabled for the wireless terminal.

16. A method according to claim 10 further comprising:
accepting external request mode enable and external request mode disable commands for the wireless terminal;
in response to an external request mode enable command, transmitting external requests for data transfer to the wireless terminal; and
in response to an external request mode disable command, disregarding external requests for data transfer for the wireless terminal.

17. A method according to claim 16 further comprising:
transmitting radiotelephone pages to the wireless terminal when the external request mode is enabled and when the external request mode is disabled.

18. A method of receiving digital data at a wireless terminal, the method comprising:
accepting user input of a blocking mode enable and blocking mode disable commands;
receiving a packet of digital data at the wireless terminal;
in response to a blocking mode enable command, processing the packet of digital data only if information in the packet of digital data is required to maintain a communications link, and blocking processing of the packet of digital data if information in the packet of digital data is not required to maintain a communications link; and
in response to a blocking mode disable command, processing the packet of digital data if information in the packet of digital data is required to maintain a communications link or if information in the packet of digital data is desired at the wireless terminal.

19. A method according to claim 18 wherein information required to maintain a communications link comprises synchronization information.

20. A method according to claim 18 further comprising:
processing radiotelephone pages when the blocking mode is enabled and when the blocking mode is disabled.

21. A method according to claim 18 further comprising:
designating at the wireless terminal acceptable sources from which packets of digital data will be processed;
determining if the packet of digital data is from an acceptable source designated for the wireless terminal;
if the packet of digital data is from an acceptable source and the blocking mode is disabled, processing the packet of digital data; and
if the received packet of digital data is not from an acceptable source, blocking processing of the packet of digital data even when the blocking mode is disabled.

22. A method according to claim 21 wherein designating at the wireless terminal acceptable sources from which packets of digital data will be processed comprises accepting user input of the acceptable sources.

23. A method according to claim 21 wherein designating at the wireless terminal acceptable sources from which packets of digital data will be processed comprises designating at least one class of sources from which packets of digital data will be processed.

24. A method according to claim 21 wherein designating at the wireless terminal acceptable sources from which packets of digital data will be processed comprises designating at least one specific source from which packets of digital data will be processed.

25. A method according to claim 18 further comprising:
accepting user input of external request mode enable and external request mode disable commands;
in response to an external request mode enable command, executing external requests for data transfer at the wireless terminal; and
in response to an external request mode disable command, disregarding external requests for data transfer at the wireless terminal.

26. A method according to claim 25 further comprising:
executing user initiated tasks when the external request mode is enabled and when the external request mode is disabled.

27. A method according to claim 25 further comprising:
processing radiotelephone pages when the external request mode is enabled and when the external request mode is disabled.

28. A method of transmitting digital data from a wireless service provider to a wireless terminal, the method comprising:
accepting blocking mode enable and blocking mode disable commands from the user terminal;
providing a packet of digital data at the wireless service provider;
in response to a blocking mode enable command, transmitting the packet of digital data only if information in the packet of digital data is required to maintain a communications link between the wireless service provider and the wireless terminal, and blocking transmitting of the packet of digital data if information in the packet of digital data is not required to maintain a communications link; and
in response to a blocking mode disable command, transmitting the packet of digital data if information in the packet of digital data is required to maintain a communications link or if information in the packet of digital data is desired at the wireless terminal.

29. A method according to claim 28 wherein information required to maintain a communications link comprises synchronization information.

30. A method according to claim 28 further comprising:
transmitting radiotelephone pages when the blocking mode is enabled and when the blocking mode is disabled.

31. A method according to claim 28 further comprising:
designating at the wireless service provider acceptable sources from which received digital data will be processed at the wireless terminal;
determining if the packet of digital data is from an acceptable source for the wireless terminal;
if the packet of digital data is from an acceptable source and the blocking mode is disabled, transmitting the packet of digital data to the wireless terminal; and
if the packet of digital data is not from an acceptable source, blocking transmitting of the packet of digital data even when the blocking mode is disabled.

32. A method according to claim 31 wherein designating at the wireless service provider acceptable sources from which packets of digital data will be processed comprises accepting the acceptable sources from the wireless terminal.

33. A method according to claim 31 wherein designating at the wireless service provider acceptable sources comprises designating at least one class of sources from which packets of digital data will be transmitted to the wireless terminal.

34. A method according to claim 31 wherein designating at the wireless service provider acceptable sources comprises designating at least one specific source from which received digital data will be transmitted to the wireless terminal.

35. A method according to claim 28 further comprising:
accepting external request mode enable and external request mode disable commands for the wireless terminal;
in response to an external request mode enable command, transmitting external requests for data transfer for the wireless terminal; and
in response to an external request mode disable command, disregarding external requests for data transfer for the wireless terminal.

36. A method according to claim 35 further comprising:
transmitting radiotelephone pages to the wireless terminal when the external request mode is enabled and when the external request mode is disabled for the wireless terminal.

37. A wireless terminal for communicating digital data with a wireless communications system, the wireless terminal comprising:
a user interface that accepts user input of a blocking mode enable and blocking mode disable commands;
a receiver that receives a packet of digital data; and
a controller that processes the packet of digital data in response to a blocking mode enable command only if information in the packet of digital data is required to maintain a communications link, and that blocks processing of the packet of digital data if information in the packet of digital data is not required to maintain a communications link, and wherein the controller processes the packet of digital data in response to a blocking mode disable command if information in the packet of digital data is required to maintain a communications link or if information in the packet of digital data is desired at the wireless terminal.

38. A wireless terminal according to claim 37 wherein information required to maintain a communications link comprises synchronization information.

39. A wireless terminal according to claim 37 wherein the controller processes radiotelephone pages when the blocking mode is enabled and when the blocking mode is disabled.

40. A wireless communications system for communicating digital data with a wireless terminal, the wireless communications system comprising:
a controller responsive to blocking mode enable and blocking mode disable commands from the wireless terminal wherein the controller provides a packet of digital data at the wireless service provider, wherein the controller allows transmission of the packet of digital data in response to a blocking mode enable command only if information in the packet of digital data is required to maintain a communications link between the wireless communications system and the wireless terminal, wherein the controller blocks transmitting of the packet of digital data in response to a blocking mode enable command if information in the packet of digital data is not required to maintain a communications link, and wherein the controller allows transmission of the packet of digital data in response to a blocking mode disable command if information in the packet of digital data is required to maintain a communications link or if information in the packet of digital data is desired at the wireless terminal.

41. A wireless communications system according to claim 40 wherein information required to maintain a communications link comprises synchronization information.

42. A wireless communications system according to claim 40 further comprising:
a transmitter that transmits radiotelephone pages when the blocking mode is enabled and when the blocking mode is disabled.

43. A method of receiving digital data at a wireless terminal, the method comprising:
accepting user input of external request mode enable and external request mode disable commands;
in response to an external request mode enable command, executing external requests for data transfer at the wireless terminal;
in response to an external request mode disable command, disregarding external requests for data transfer at the wireless terminal,
accepting user input of a blocking mode enable and blocking mode disable commands;
receiving a packet of digital data at the wireless terminal;
in response to a blocking mode enable command, processing the packet of digital data only if information in the packet of digital data is required to maintain a communications link, and blocking processing of the packet of digital data if information in the packet of digital data is not required to maintain a communications link; and
in response to a blocking mode disable command, processing the packet of digital data if information in the packet of digital data is required to maintain a communications link or if information in the packet of digital data is desired at the wireless terminal.

44. A method according to claim 43 further comprising:
executing user initiated tasks when the external request mode is enabled and when the external request mode is disabled.

45. A method according to claim 43 further comprising:
processing radiotelephone pages when the external request mode is enabled and when the external request mode is disabled.

46. A method according to claim 43 further comprising:
designating at the wireless terminal acceptable sources from which received digital data will be processed;
receiving a packet of digital data at the wireless terminal;
determining if the packet of digital data is from an acceptable source designated at the wireless terminal;
if the packet of digital data is from an acceptable source, processing the packet of digital data; and
if the packet of digital data is not from an acceptable source, blocking the packet of digital data from processing.

47. A method according to claim 46 wherein designating at the wireless terminal acceptable sources from packets of digital data will be processed comprises accepting user input of the acceptable sources.

48. A method according to claim 46 wherein designating at the wireless terminal acceptable sources from which packets of digital data will be processed comprises designating at least one class of sources from which packets of digital data will be processed.

49. A method according to claim 46 wherein designating at the wireless terminal acceptable sources from which packets of digital data will be processed comprises designating at least one specific source from which packets of digital data will be processed.

50. A method according to claim 43 wherein information required to maintain a communications link comprises synchronization information.

51. A method according to claim 43 further comprising:
processing radiotelephone pages when the blocking mode is enabled and when the blocking mode is disabled.

52. A method of transmitting digital data from a wireless service provider to a wireless terminal, the method comprising:
accepting external request mode enable and external request mode disable commands for the wireless terminal;
in response to an external request mode enable command for the wireless terminal, transmitting external requests for data transfer to the wireless terminal;
in response to an external request mode disable command for the wireless terminal, disregarding external requests for data transfer at the wireless terminal,
accepting blocking mode enable and blocking mode disable commands for the wireless terminal;
receiving a packet of digital data for the wireless terminal;
in response to a blocking mode enable command for the wireless terminal, transmitting the packet of digital data only if information in the packet of digital data is required to maintain a communications link, and blocking transmitting of the packet of digital data if information in the packet of digital data is not required to maintain a communications link; and
in response to a blocking mode disable command for the wireless terminal, transmitting the packet of digital data if information in the packet of digital data is required to maintain a communications link or if information in the packet of digital data is desired at the wireless terminal.

53. A method according to claim 52 further comprising:
supporting tasks initiated at the wireless terminal when the external request mode is enabled and when the external request mode is disabled.

54. A method according to claim 52 further comprising:
transmitting radiotelephone pages to the wireless terminal when the external request mode is enabled for the wireless terminal and when the external request mode is disabled for the wireless terminal.

55. A method according to claim 52 further comprising:
designating at the wireless service provider acceptable sources from which packets of digital data will be processed for the wireless terminal;
providing a packet of digital data for the wireless terminal;
determining if the packet of digital data is from an acceptable source designated for the wireless terminal;
if the packet of digital data is from an acceptable source, transmitting the packet of digital data; and
if the packet of digital data is not from an acceptable source, blocking transmitting of the packet of digital data.

56. A method according to claim 55 wherein designating at the wireless service provider acceptable sources from which digital data will be processed at the wireless terminal comprises receiving the acceptable sources from the wireless terminal.

57. A method according to claim 55 wherein designating at the wireless service provider acceptable sources from which received digital data will be processed at the wireless terminal comprises designating at least one class of sources from which received digital data will be processed at the wireless terminal.

58. A method according to claim 55 wherein designating at the wireless service provider acceptable sources from which digital data will be processed at the wireless terminal comprises designating at least one specific source from which digital data will be processed at the wireless terminal.

59. A method according to claim 52 wherein information required to maintain a communications link comprises synchronization information.

60. A method according to claim 52 further comprising:
transmitting radiotelephone pages to the wireless terminal when the blocking mode is enabled and when the blocking mode is disabled for the wireless terminal.

* * * * *